United States Patent
Suzuki et al.

(10) Patent No.: US 9,158,678 B2
(45) Date of Patent: Oct. 13, 2015

(54) MEMORY ADDRESS MANAGEMENT SYSTEM AND METHOD

(71) Applicant: KABUSHIKI KAISHA TOSHIBA, Tokyo (JP)

(72) Inventors: Riki Suzuki, Yokohama (JP); Shohei Asami, Yokohama (JP); Toshikatsu Hida, Yokohama (JP); Hiroshi Yao, Yokohama (JP); Kazuhiro Fukutomi, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 161 days.

(21) Appl. No.: 13/893,615

(22) Filed: May 14, 2013

(65) Prior Publication Data

US 2014/0281144 A1  Sep. 18, 2014

Related U.S. Application Data (60) Provisional application No. 61/778,968, filed on Mar. 13, 2013.

(51) Int. Cl.
*G06F 12/02* (2006.01)
*G06F 12/10* (2006.01)

(52) U.S. Cl.
CPC ........ *G06F 12/0246* (2013.01); *G06F 12/1027* (2013.01)

(58) Field of Classification Search
CPC ............ G06F 12/0246; G06F 12/1027; G06F 12/1036
USPC .................................. 711/103, 200, 206, 207
See application file for complete search history.

(56) References Cited

U.S. PATENT DOCUMENTS

| | | | | |
|---|---|---|---|---|
| 6,965,963 | B1 * | 11/2005 | Nakanishi et al. | 711/103 |
| 7,610,435 | B2 * | 10/2009 | Nakanishi et al. | 711/103 |
| 8,316,208 | B2 * | 11/2012 | Mukaida | 711/202 |
| 8,745,310 | B2 * | 6/2014 | Nishihara et al. | 711/103 |
| 2001/0012222 | A1 * | 8/2001 | Terasaki | 365/200 |
| 2002/0062433 | A1 * | 5/2002 | Suzuki | 711/203 |
| 2002/0069314 | A1 * | 6/2002 | Miyauchi | 711/103 |
| 2005/0144418 | A1 * | 6/2005 | Kita | 711/203 |
| 2008/0016267 | A1 * | 1/2008 | Oyaizu | 711/103 |
| 2009/0055618 | A1 * | 2/2009 | Nakanishi et al. | 711/173 |
| 2009/0083478 | A1 * | 3/2009 | Kunimatsu et al. | 711/103 |

(Continued)

FOREIGN PATENT DOCUMENTS

JP  2001-243110  9/2001
JP  4679581  2/2011

*Primary Examiner* — Jared Rutz
*Assistant Examiner* — Khoa D Doan
(74) *Attorney, Agent, or Firm* — Oblon, McClelland, Maier & Neustadt, L.L.P.

(57) ABSTRACT

According to one embodiment, a memory system includes a nonvolatile memory including first blocks configured to store an address indicating a data storage position, and second blocks configured to store the data, a first table configured to store a first address including first information and second information, the second information indicating a data storage position in the first block, and a second table configured to convert the first information into third information, the first information having a first data size by which one entry of the second table can be identified, the third information having a second data size which is larger than the first data size and by which one of the first blocks and the second blocks can be identified.

7 Claims, 10 Drawing Sheets

(56) References Cited

U.S. PATENT DOCUMENTS

| | | | |
|---|---|---|---|
| 2009/0248964 A1* | 10/2009 | Yano et al. | 711/103 |
| 2010/0064111 A1* | 3/2010 | Kunimatsu et al. | 711/161 |
| 2010/0070735 A1* | 3/2010 | Chen et al. | 711/206 |
| 2010/0095049 A1* | 4/2010 | Manning | 711/103 |
| 2011/0004725 A1* | 1/2011 | Tanaka | 711/103 |
| 2011/0022780 A1* | 1/2011 | Wakrat et al. | 711/103 |
| 2012/0066568 A1* | 3/2012 | Komagome | 714/764 |
| 2012/0072680 A1* | 3/2012 | Kimura et al. | 711/154 |
| 2012/0079167 A1* | 3/2012 | Yao et al. | 711/103 |
| 2012/0226957 A1* | 9/2012 | Fukutomi et al. | 714/758 |
| 2012/0246383 A1* | 9/2012 | Asano et al. | 711/102 |
| 2013/0198439 A1* | 8/2013 | Kurotsuchi et al. | 711/103 |
| 2014/0025865 A1* | 1/2014 | Marukame et al. | 711/103 |
| 2014/0325129 A1* | 10/2014 | Ahlquist | 711/103 |

* cited by examiner

MEMORY ADDRESS MANAGEMENT SYSTEM AND METHOD

CROSS-REFERENCE TO RELATED APPLICATIONS

This application claims the benefit of U.S. Provisional Application No. 61/778,968, filed Mar. 13, 2013, the entire contents of which are incorporated herein by reference.

FIELD

Embodiments described herein relate generally to a memory system.

BACKGROUND

A NAND flash memory is known as a kind of a nonvolatile semiconductor memory device. A storage device incorporating the NAND flash memory is also known.

When accessing the NAND flash memory in the storage device based on a logical address supplied from a host to the storage device, an address conversion table showing the correspondence between the logical address and a data storage position in the NAND flash memory is used. This address conversion table includes elements capable of accessing the whole area of the NAND flash memory. Therefore, the amount of management information increases as the memory capacity of the NAND flash memory increases, and the memory capacity of a RAM required to store the address conversion table also increases.

BRIEF DESCRIPTION OF THE DRAWINGS

FIG. 6 is a schematic view for explaining the storage state of the address conversion table when the memory system is powered on;

DETAILED DESCRIPTION

In general, according to one embodiment, there is provided a memory system comprising:

a nonvolatile memory including first blocks configured to store an address indicating a data storage position, and second blocks configured to store the data, each of the first blocks and the second blocks including memory cells;

a memory unit configured to store a table;

a first table stored in the memory unit and configured to store a first address including first information and second information, the second information indicating a data storage position in the first block;

a second table stored in the memory unit and configured to convert the first information into third information, the first information having a first data size by which one entry of the second table can be identified, the third information having a second data size which is larger than the first data size and by which one of the first blocks and the second blocks can be identified; and a controller configured to access the nonvolatile memory by using a second address obtained by replacing the first information of the first address with the third information.

The embodiment of the present invention will be explained below. Note that in the following explanation, the same reference numbers denote elements having the same functions and arrangements, and a repeated explanation will be given only if necessary.

[1. Configuration of Memory System]

The memory system includes a nonvolatile semiconductor memory device. The nonvolatile semiconductor memory device is a nonvolatile memory (non-transitory memory) in which data is not lost even when the power supply is shut down. This embodiment will be explained by taking a NAND flash memory as an example of the nonvolatile semiconductor memory device. Also, the memory system will be explained by taking a solid-state drive (SSD) as an example of a storage device including the NAND flash memory.

Figure 1:
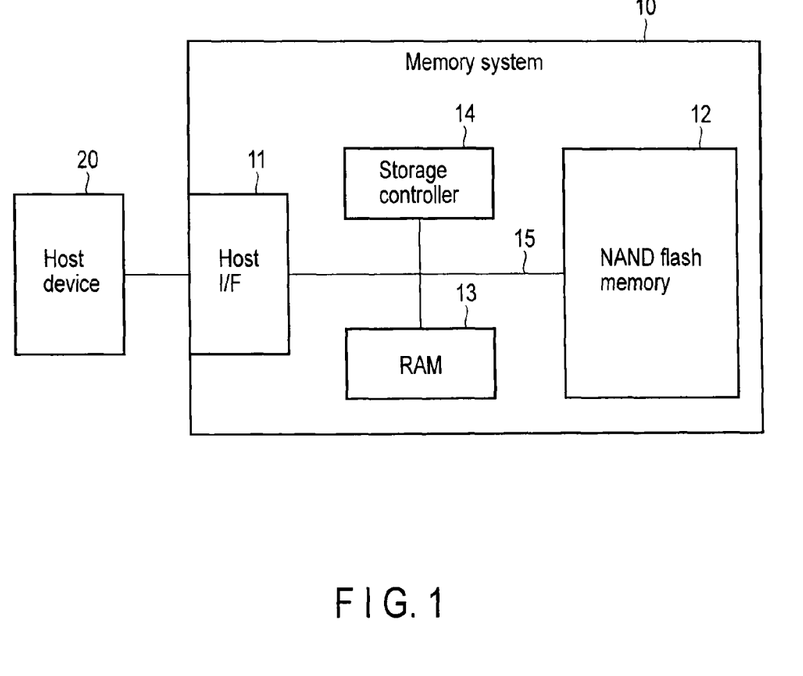
FIG. 1 is a block diagram of a memory system.

FIG. 1 is a block diagram of the memory system (storage device). A memory system 10 includes a host interface (host I/F) 11, NAND flash memory 12, random access memory (RAM) 13, and storage controller 14, and these processing units are connected via a bus 15.

The host interface 11 is a memory connecting interface such as an Advanced Technology Attachment (ATA) interface, and an interface for a host device 20. The host device 20 is an external device for writing data to and reading data from the memory system 10. Examples of the host device 20 are a personal computer, a CPU core, a server connected to a network, and a combination thereof.

The NAND flash memory 12 is a memory device capable of nonvolatilly storing data, and used as a memory unit for storing user data, programs, and internal data of the memory system. More specifically, the NAND flash memory 12 stores data designated by the host device 20, and stores management information for managing a data storage position in the NAND flash memory 12 and data such as firmware programs to be nonvolatilly stored. In the NAND flash memory 12, erase is performed for each block, and write and read are performed for each page. The NAND flash memory 12 includes a memory cell array in which a plurality of memory cells are arranged in a matrix, and this memory cell array is formed by arranging a plurality of physical blocks as data erase units. In the NAND flash memory 12, write and read are performed for each physical page. A physical page includes a plurality of memory cells. A physical block (memory block or data block) includes a plurality of physical pages.

The RAM 13 is used as a data transfer cache between the host device 20 and NAND flash memory 12, and as a memory unit for temporary storage such as a work area memory. "Temporary storage" herein mentioned is a state in which data cannot be held when the power supply is shut down. Data to be stored in the RAM 13 is, for example, a management table expanded (read) from the NAND flash memory 12 upon activation. Note that a dynamic RAM (DRAM) or static RAM (SRAM) is mainly used as the RAM 13, and it is also possible to use a ferroelectric RAM (FeRAM), magnetoresistive RAM (MRAM), or phase-change RAM (PRAM).

The storage controller 14 is a controller (control unit) for controlling the memory system 10, and configured by a central processing unit (CPU) or the like. The storage controller 14 has a function of processing commands from the host device 20, a function of transferring data between the NAND flash memory 12 and host device 20 via the RAM 13, and a function of managing each block in the NAND flash memory 12.

The memory system 10 is connected to the host device 20 via the host interface 11, and used as an external memory, for example, a secondary memory device (solid-state drive [SSD]) of the host device 20. The memory system 10 has a function of storing data for which a write request is issued from the host device 20, and a function of reading data for which a read request is issued from the host device 20, and outputting the read data to the host device 20.

Figure 2:
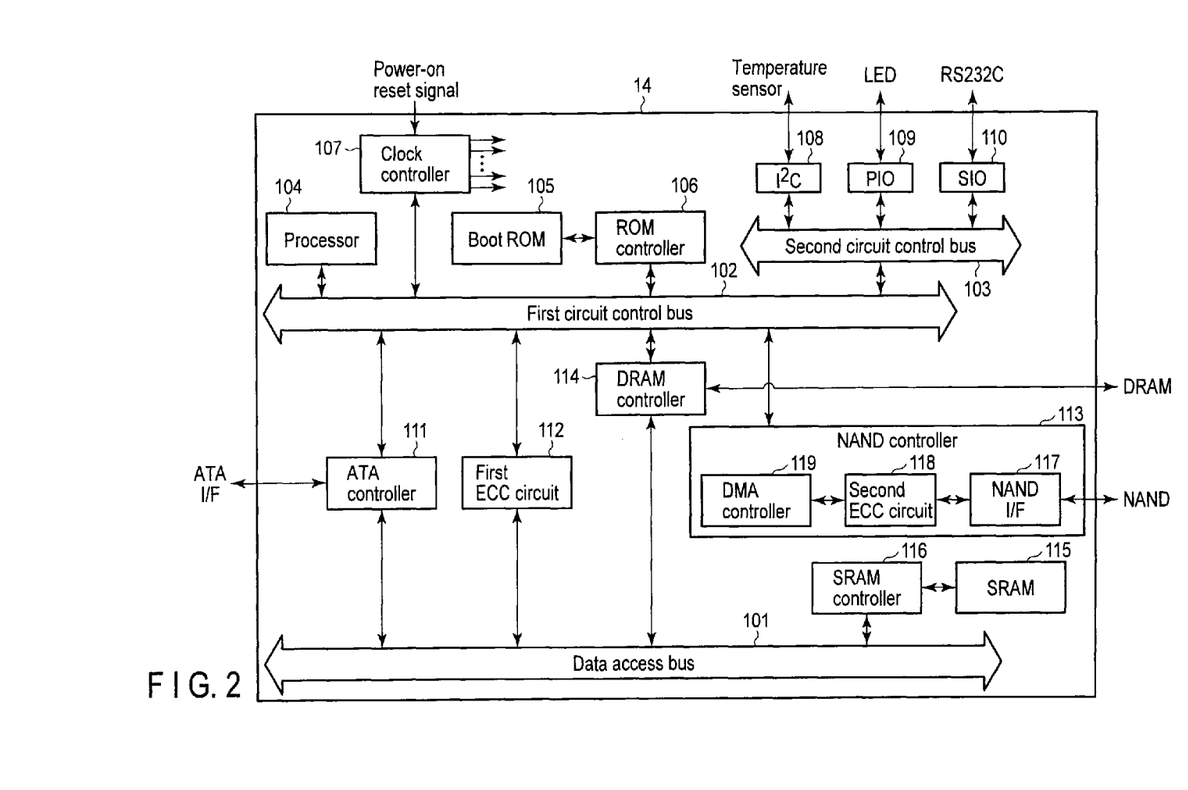
FIG. 2 is a block diagram showing an example of a storage controller.

FIG. 2 is a block diagram showing an example of the storage controller 14 shown in FIG. 1. The storage controller 14 includes a data access bus 101, first circuit control bus 102, and second circuit control bus 103. A processor 104 for controlling the whole storage controller 14 is connected to the first circuit control bus 102. A boot ROM 105 is connected to the first circuit control bus 102 via a ROM controller 106. A boot program for booting each management program (firmware) stored in the NAND flash memory 12 is stored in the boot ROM 105.

In addition, a clock controller 107 is connected to the first circuit control bus 102. The clock controller 107 receives a power-on reset signal from a power supply circuit, and supplies a reset signal and clock signal to each unit.

The second circuit control bus 103 is connected to the first circuit control bus 102. An I²C circuit 108 for receiving data from a temperature sensor, a parallel IO (PIO) circuit 109 for supplying a status indication signal to a status indication LED, and a serial IO (SIO) circuit 110 for controlling an RS232C interface are connected to the second circuit control bus 103.

An ATA interface controller (ATA controller) 111, a first error checking and correction (ECC) circuit 112, a NAND controller 113 as a controller for the NAND flash memory, and a DRAM controller 114 are connected to both the data access bus 101 and first circuit control bus 102. The ATA controller 111 exchanges data with the host device 20 via an ATA interface. An SRAM 115 to be used as a data work area and firmware expansion area is connected to the data access bus 101 via an SRAM controller 116. When the system is activated, firmware stored in the NAND flash memory is transferred to the SRAM 115 by the boot program stored in the boot ROM 105.

The NAND controller 113 includes a NAND interface 117, second ECC circuit 118, and DMA controller 119 for DMA transfer control. The NAND interface 117 interfaces with the NAND flash memory. The DMA controller 119 for DMA transfer control controls access between the NAND flash memory and RAM (DRAM). The second ECC circuit 118 encodes a second correcting code, and encodes and decodes a first error correcting code. The first ECC circuit 112 decodes the second error correcting code. Examples of the first and second error correcting codes are a Hamming code, Bose Chaudhuri Hocqenghem (BCH) code, Reed Solomon (RS) code, and low-density parity check (LDPC) code, and the correctability of the second error correcting code is higher than that of the first error correcting code.

(Definitions)

The definitions of terms relevant to the memory system of this embodiment will be explained.

A physical page is a unit for which read or write can be performed at once inside the NAND flash memory. A logical page is a read/write unit set in the memory system. One logical page corresponds to one or more physical pages.

A physical block is a minimum unit for which data can independently be erased inside the NAND flash memory. The physical block includes a plurality of physical pages. A logical block is a data erase unit set in the memory system. One logical block corresponds to one or more physical pages.

A sector is a minimum unit of access from the host.

A cluster is a management unit for managing data in the memory system. A cluster size is set to be equal to or larger than a sector size, and equal to the data management unit of a file system adopted by the OS of the host or to a logical page size. An integral multiple of 2 or more of the cluster size may also correspond to the logical page size. One cluster corresponds to, for example, eight sectors.

A logical block number LBN is a number given to each logical block in order to identify the logical block, and is used as, for example, the ID (index) of the logical block.

A logical cluster number LCN is a number given to each logical cluster in order to identify the logical cluster, and is used as, for example, the ID (index) of the logical cluster.

A logical cluster address LCA is a logical cluster address on the memory system. The logical cluster address LCA corresponds to the logical block number LBN and logical cluster number LCN.

[2. Address Conversion Table]

A write corresponding to a request from the host device is designated by a logical address (logical block addressing [LBA]) used in the host device. On the other hand, a write to the NAND flash memory 12 is designated by a logical storage position, which is different from the logical address LBA, in the NAND flash memory 12. In this embodiment, an address conversion table (lookup table [LUT]) is used when accessing a logical address (data storage position) in the NAND flash memory based on the logical address LBA supplied from the host device.

Figure 3:
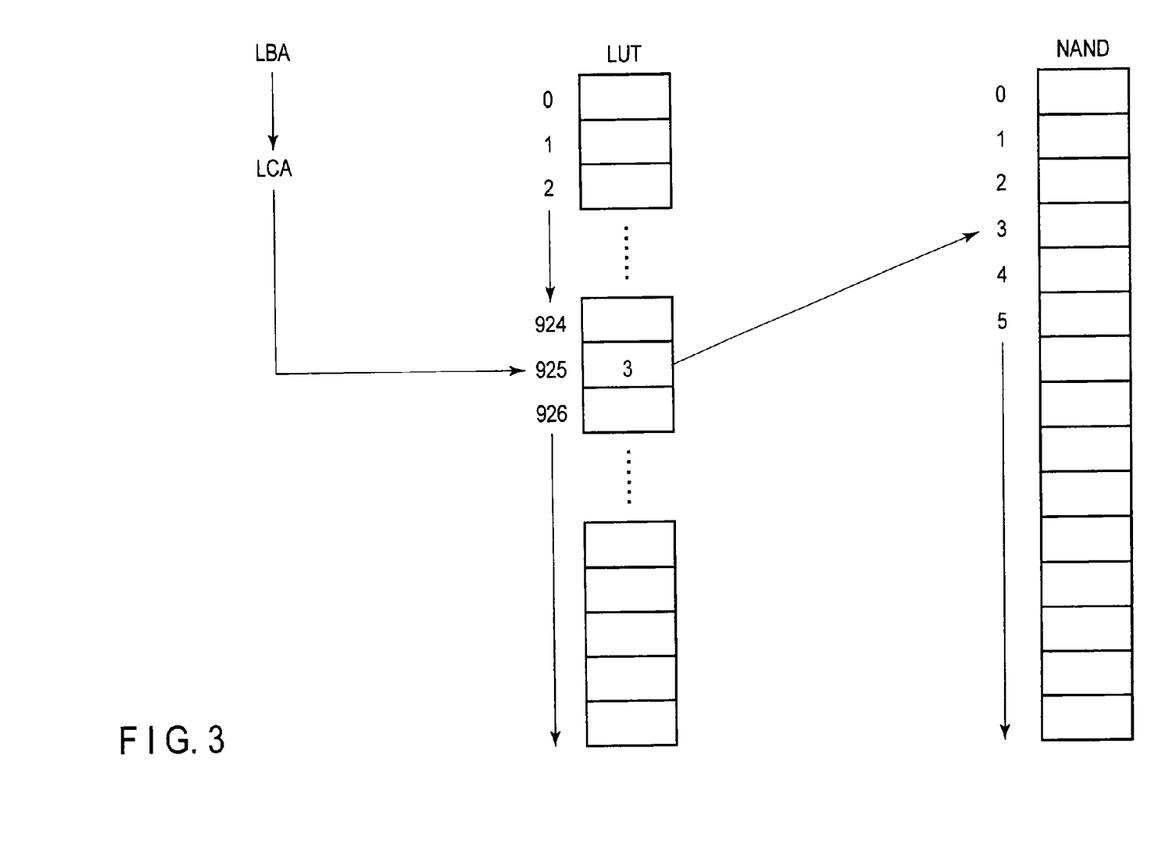
FIG. 3 is a schematic view for explaining an access method using an address conversion table.

FIG. 3 is a schematic view for explaining an access method using the address conversion table LUT. The logical address LBA received from the host device is converted into the logical cluster address LCA. Subsequently, a specific index in the address conversion table LUT is referred to, and a specific logical address on the NAND flash memory is accessed based on an address corresponding to the index.

The address conversion table LUT manages the correspondence between an address at which the host device designates user data, and the logical storage position, which corresponds to the address, of latest data in the memory system. More specifically, the management unit of user data is a cluster, and the address conversion table LUT manages the correspondence between the logical cluster address LCA and logical block number LBN+logical cluster number LCN. The address conversion table LUT has a multi-stage structure, and includes first, second, and third tables TB1, TB2, and TB3.

The first table TB1 (region address information) is entirely expanded on the RAM, and includes elements capable of covering a whole area accessible by LBA. The unit of each element of the first table TB1 is not a cluster but a region which is a range gathered a plurality of consecutive cluster. That is, the first table TB1 is a table in which the LBA space accessible by the user is partitioned by the region size. One region corresponds to, for example, four clusters. The first table TB1 has an arrangement in which indices (region numbers REN) are allocated, and an address in the third table TB3 or second table TB2 is written in each element.

The second table TB2 (cluster address information) is a RAM area (cache area) for storing latest data position information (a table entry) that is read from the third table TB3 and concerns each cluster in a region covered by one element of the first table TB1.

The third table TB3 (cluster address information) is an area on the NAND flash memory, and stores the latest data position information (table entry) concerning the whole area accessible by LBA.

In addition, the address conversion table LUT of this embodiment includes an address block table (fourth table) TB4. The fourth table TB4 manages address information of a block to be used to store address information. The fourth table TB4 is expanded on the RAM from the NAND flash memory. The fourth table TB4 will be described in detail later.

Figure 4:
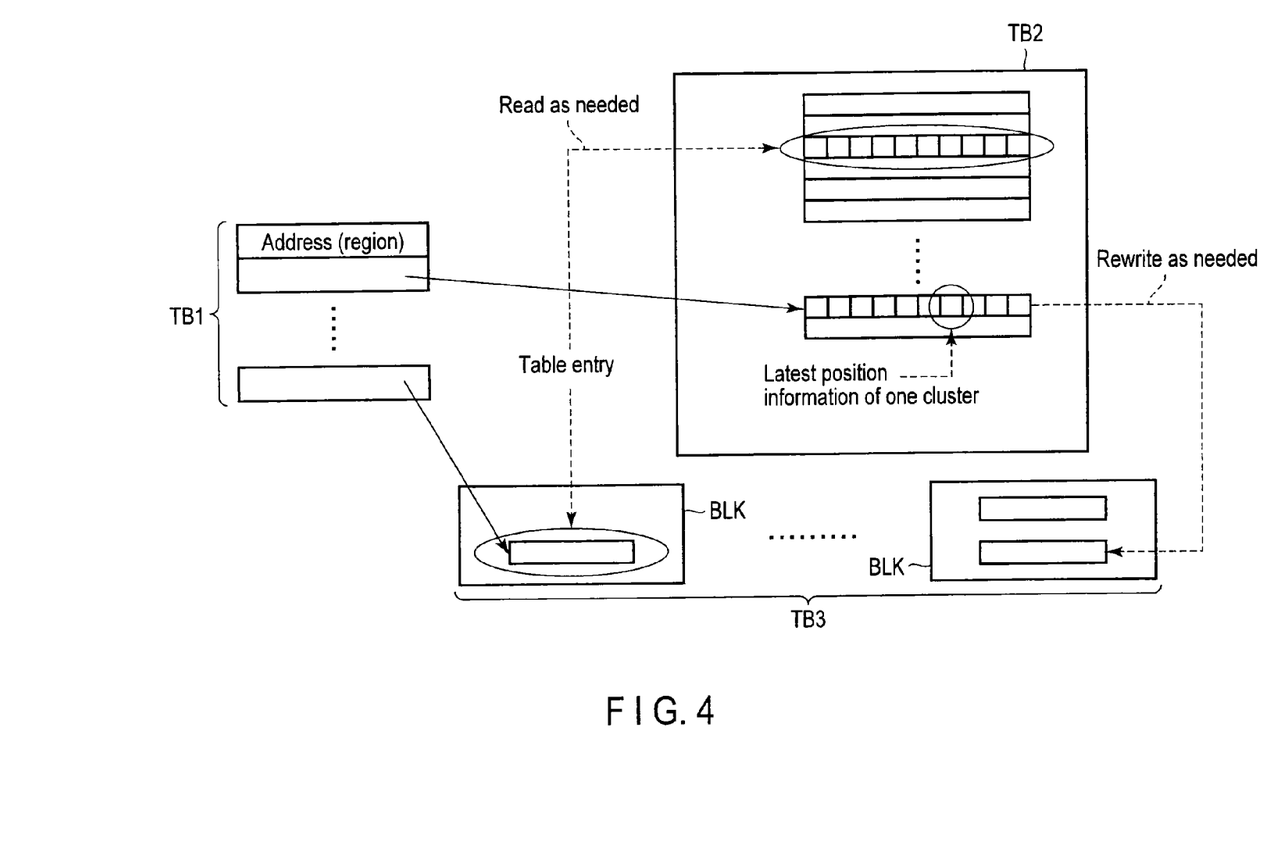
FIG. 4 is a schematic view for explaining the relationship between various tables contained in the address conversion table.

FIG. 4 is a schematic view for explaining the relationship between the first, second, and third tables TB1, TB2, and TB3 contained in the address conversion table LUT. Rectangles shown in the first, second, and third tables TB1, TB2, and TB3 indicate address information to be managed by these tables.

The first table TB1 is expanded on the RAM 13 from the NAND flash memory 12. First, first address information corresponding to a given region number of the first table TB1 is accessed. If the first address information of the first table TB1 designates the second table TB2, second address information is acquired by accessing the second table TB2. Then, position information of a logical cluster is acquired from the second address information. The second table TB2 contains some pieces of address information read from the third table TB3. If the second address information is updated, the second address information is rewritten in the third table TB3.

On the other hand, if the first address information of the first table TB1 designates the third table TB3 (i.e., if there is no address information to be acquired in the second table TB2), third address information is acquired by accessing the third table TB3, and stored in the second table TB2 as needed. Then, position information of a logical cluster is acquired from the third address information.

[3. Operation of Memory System]

Since the size of one address information is small, an address space for storing address information contained in the address conversion table LUT is narrower than the whole address space of the NAND flash memory 12. Therefore, blocks for storing address information are restricted in the NAND flash memory 12, and address information is stored in only the restricted blocks (address blocks). There are only a few address blocks, so the amount of address information concerning the address blocks is small. As described previously, the address information of the address blocks is stored in the fourth table (address block table) TB4 contained in the address conversion table LUT.

Figure 5:
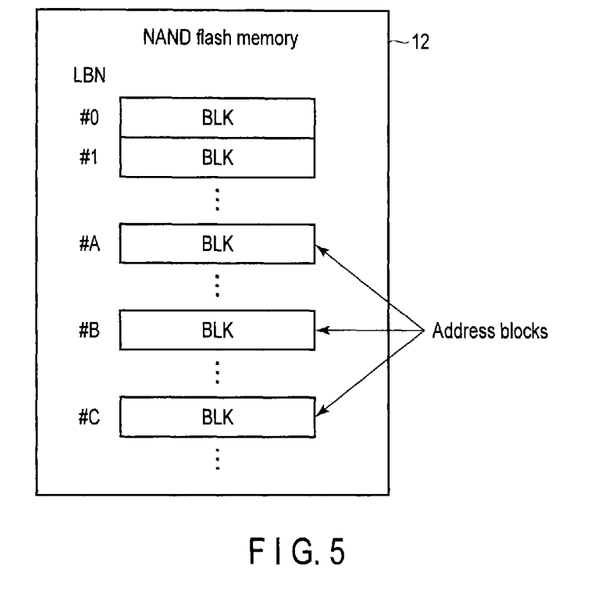
FIG. 5 is a schematic view for explaining address blocks.

FIG. 5 is a schematic view for explaining the address blocks. The NAND flash memory 12 includes a plurality of blocks BLK. Of the plurality of blocks BLK, blocks corresponding to logical block numbers LBN #A, #B, and #C are designated as address blocks, and address blocks #A, #B, and #C are used to store the address information concerning the address conversion table LUT. The number of address blocks is appropriately set in accordance with the memory capacity of the NAND flash memory 12. That is, the number of address blocks must be increased when the memory capacity of the NAND flash memory 12 increases, and can be decreased when the memory capacity of the NAND flash memory 12 decreases. Note that it is possible to select a plurality of blocks having consecutive logical block numbers, or a plurality of blocks having inconsecutive logical block numbers as shown in FIG. 5, as the address blocks.

Figure 6:
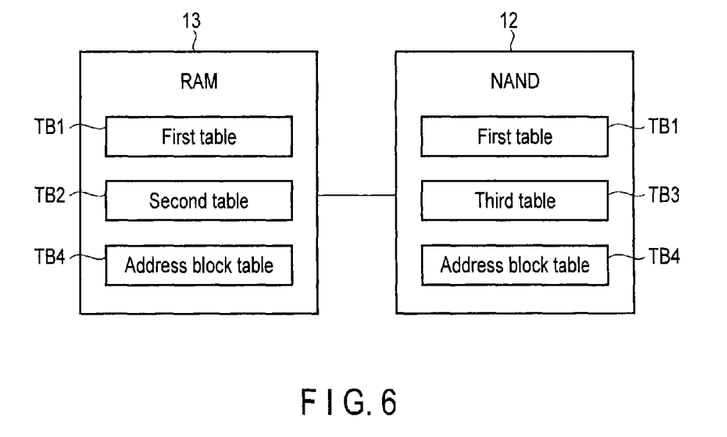

FIG. 6 is a schematic view for explaining the storage state of the address conversion table LUT when the memory system 10 is powered on. As described above, the address conversion table LUT contains the first, second, third, and fourth tables TB1, TB2, TB3, and TB4. The NAND flash memory 12 nonvolatilely stores the first, third, and fourth tables TB1, TB3, and TB4. The RAM 13 as a cache area stores the first and fourth tables TB1 and TB4 read from the NAND flash memory 12. In addition, the RAM 13 stores the second table TB2 containing some pieces of address information read from the third table TB3 of the NAND flash memory 12.

The first and fourth tables TB1 and TB4 in the RAM 13 are rewritten to the NAND flash memory 12 as needed (for example, when data is updated). Note that when the memory system 10 is powered off, the data stored in the NAND flash memory 12 remains the same as that shown in FIG. 6, but no data is stored in the volatile RAM 13.

Figure 7:
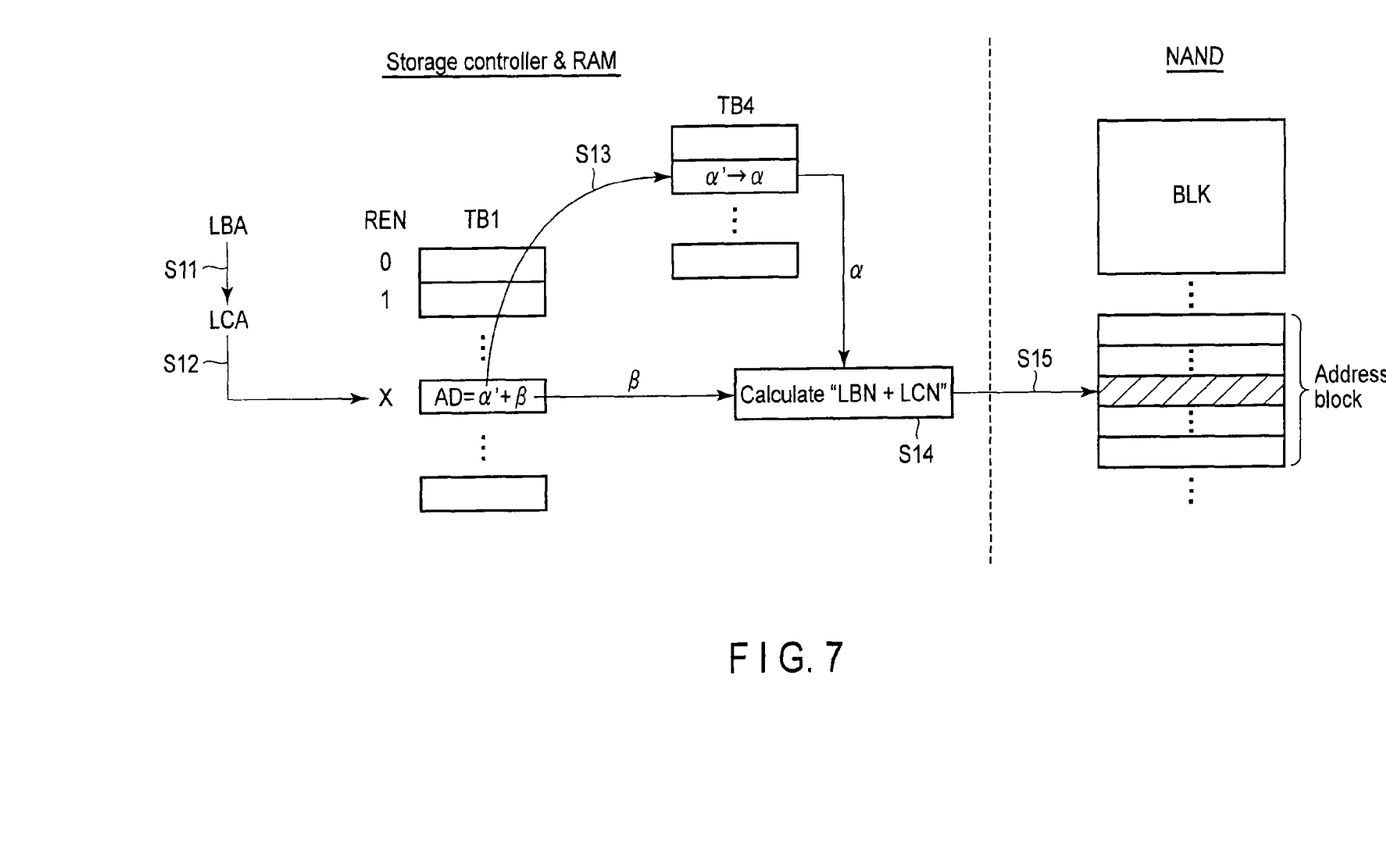
FIG. 7 is a schematic view for explaining a data storage position acquiring operation.
Figure 8:
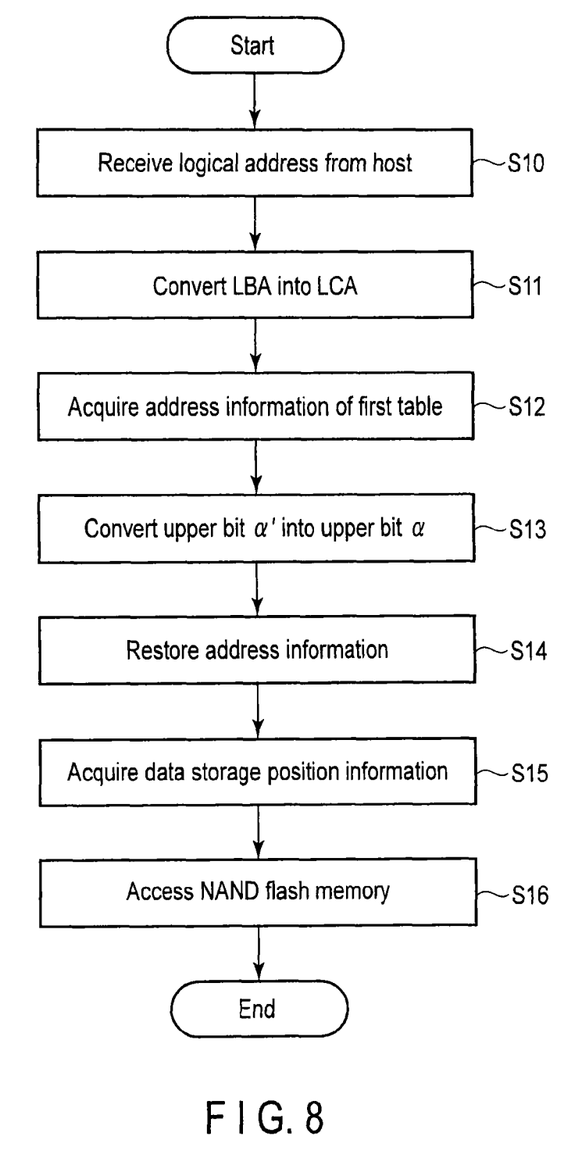
FIG. 8 is a flowchart showing the data storage position acquiring operation.

Next, an operation of acquiring a data storage position corresponding to a logical address will be explained. FIG. 7 is a schematic view for explaining the data storage position acquiring operation. FIG. 8 is a flowchart showing the data storage position acquiring operation.

When the memory system 10 receives the logical address LBA from the host device 20 (step S10), the storage controller 14 converts the logical address LBA into the logical cluster address LCA (step S11). Subsequently, the storage controller 14 accesses the first table TB1 of the RAM 13, and acquires first address information AD having a corresponding region number REN based on the logical cluster address LCA (step S12).

The first address information AD contains an upper bit $\alpha'$ and lower bit $\beta$. The upper bit $\alpha'$ indicates the entry number of the fourth table TB4. The bit number of the upper bit $\alpha'$ is compressed to a bit number by which the number of (only a few) address blocks can be identified. The lower bit $\beta$ is address information (for example, the logical cluster number LCN) for designating a corresponding logical address in the address block. The upper and lower bits each have a size (bit number) for storing required information. Note that restricted blocks for storing address information can be changed by changing information a of blocks stored in the address block table (fourth table TB4).

The storage controller 14 refers to the upper bit (entry number) $\alpha'$ of the first address information AD acquired from the first table TB1, and accesses the fourth table TB4 based on the upper bit $\alpha'$. Then, the storage controller 14 converts the upper bit $\alpha'$ into an upper bit a (step S13).

The upper bit $\alpha$ is address information (for example, the logical block number LBN) for identifying all blocks in the NAND flash memory 12, and is an address allocated to all blocks in the NAND flash memory. Since the upper bit $\alpha$ is information for identifying all blocks in the NAND flash memory, the data size (bit number) is larger than that of the upper bit $\alpha'$ and increases as the memory capacity of the NAND flash memory increases. However, the first table TB1 stores, instead of the upper bit $\alpha$, the upper bit $\alpha'$ whose data size is smaller than that of the upper bit $\alpha$, so the size of the first table TB1 reduces.

Subsequently, the storage controller 14 restores (reconstitutes) the address information (step S14). That is, the storage controller 14 calculates third address information (for example, the logical block number LBN and logical cluster number LCN) for accessing the second table TB2 or third table TB3, by using second address information α+β obtained by adding the upper bit α acquired from the fourth table TB4 and the lower bit β stored in the first table TB1. Based on the calculated third address information, the storage controller 14 acquires the data storage position information from the third table TB3 of the NAND flash memory 12, or from the second table TB2 expanded on the RAM 13 from the third table TB3 of the NAND flash memory 12 (step S15). After that, the data (cluster) stored in the NAND flash memory 12 is accessed by using this data storage position information (step S16). This access includes a process of reading the data from the NAND flash memory 12, and a process of writing the data to the NAND flash memory 12.

EXAMPLE

Figure 9:
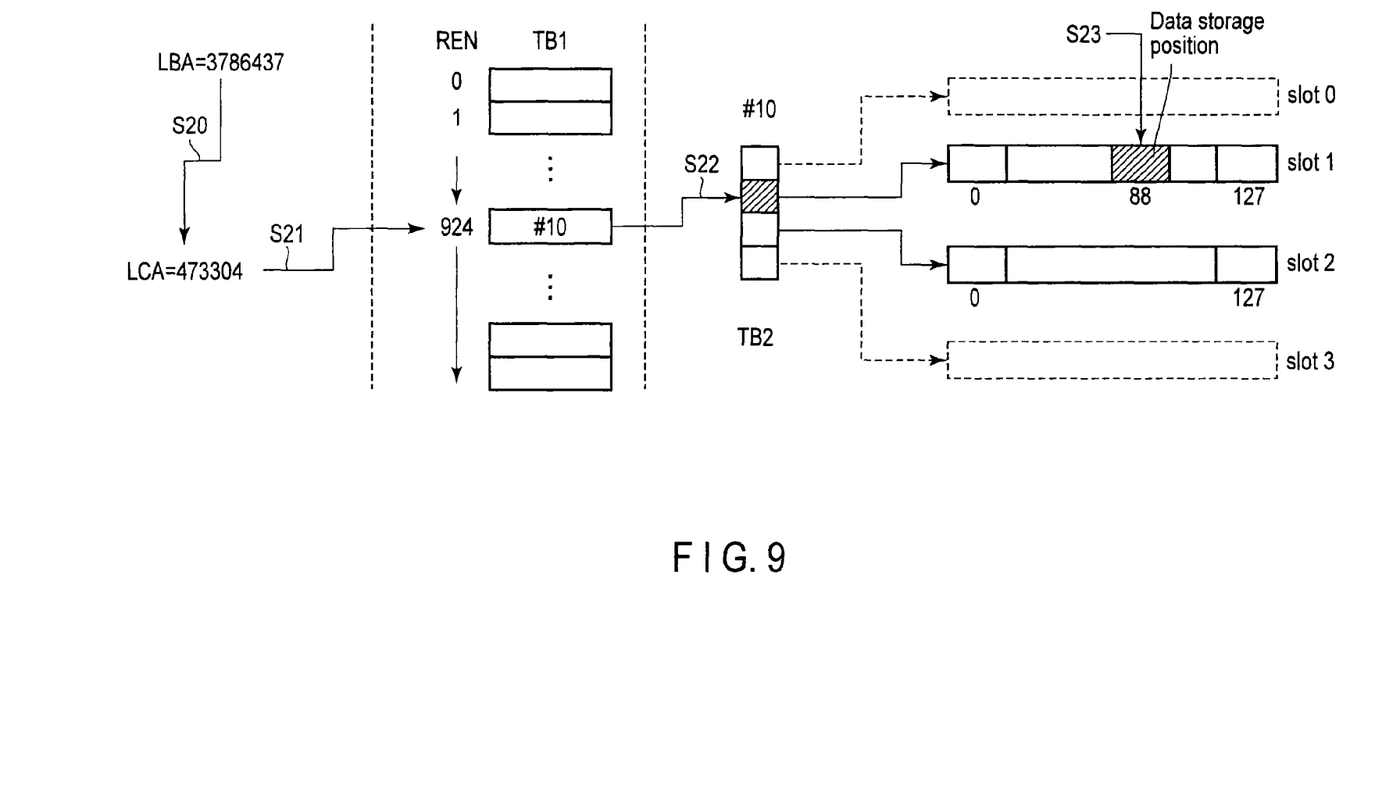
FIG. 9 is a schematic view for explaining a data storage position information acquiring operation according to an example.

A more detailed example for acquiring the data storage position information by using the logical address LBA will be explained below. FIG. 9 is a schematic view for explaining the data storage position information acquiring operation according to the example. Assume that 1 cluster=8 sectors and 1 region=512 clusters.

When the memory system 10 receives the logical address LBA (for example, LBA=3786437) from the host device 20, the storage controller 14 converts the logical address LBA into the logical cluster address LCA (step S20). The logical cluster address LCA is a quotient obtained by dividing the logical address LBA by the number of sectors in one cluster.

Then, the storage controller 14 accesses the region number REN of the first table TB1 based on the logical cluster address LCA (step S21). The region number REN is a quotient obtained by dividing the logical cluster address LCA by the region size. In step S21, the address information (for example, #10) of the second table TB2 (or third table TB3) is acquired.

Subsequently, the storage controller 14 accesses a slot contained in address information #10 of the second table TB2 (step S22). In step S22, a quotient obtained by dividing the remainder of the division in step S21 by 128 is used. After that, the storage controller 14 acquires data storage position information in the slot by using the remainder of the division in step S22 (step S23).

[4. Effect]

In this embodiment as described in detail above, the address conversion table LUT includes the first table TB1 for storing the address information of data stored in the NAND flash memory. Also, of all blocks in the NAND flash memory, blocks for storing an address indicating the storage position of data corresponding to a logical address are restricted. The first table TB1 is configured to manage these restricted blocks. Since this can reduce the amount of address information to be stored in the first table TB1, the memory capacity of the storage unit (RAM) for storing the first table TB1 can be reduced.

[5. Application Examples]

Configuration examples of the host device 20 will be explained below. The host device 20 can be configured by a personal computer.

Figure 10:
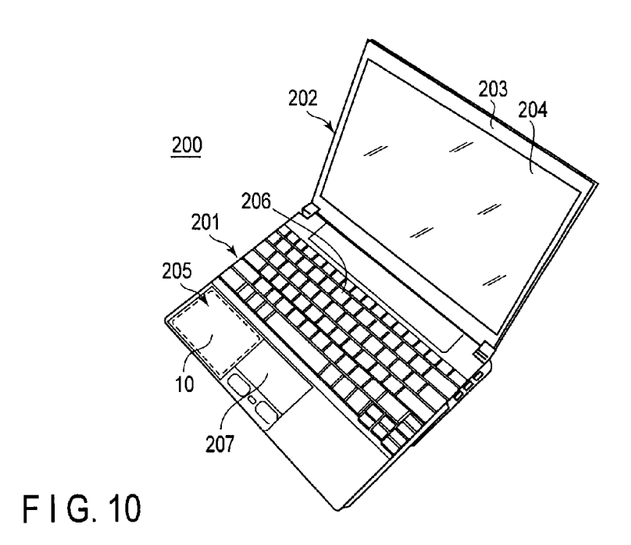
FIG. 10 is a perspective view showing an example of a personal computer incorporating an SSD.

FIG. 10 is a perspective view showing an example of a personal computer 200 incorporating the SSD 10 of the above-mentioned embodiment. The personal computer 200 (for example, a notebook computer) includes a main body 201 and display unit 202. The display unit 202 includes a display housing 203, and a display device 204 housed in the display housing 203.

The main body 201 includes a housing 205, a keyboard 206, and a touchpad 207 as a pointing device. The housing 205 houses, for example, a main circuit board, an optical disk drive (ODD) unit, a card slot, and the SSD 10.

The SSD 10 can be incorporated into the personal computer 200 instead of a conventional HDD, and can also be used as an additional device connected to an interface of the personal computer 200.

Figure 11:
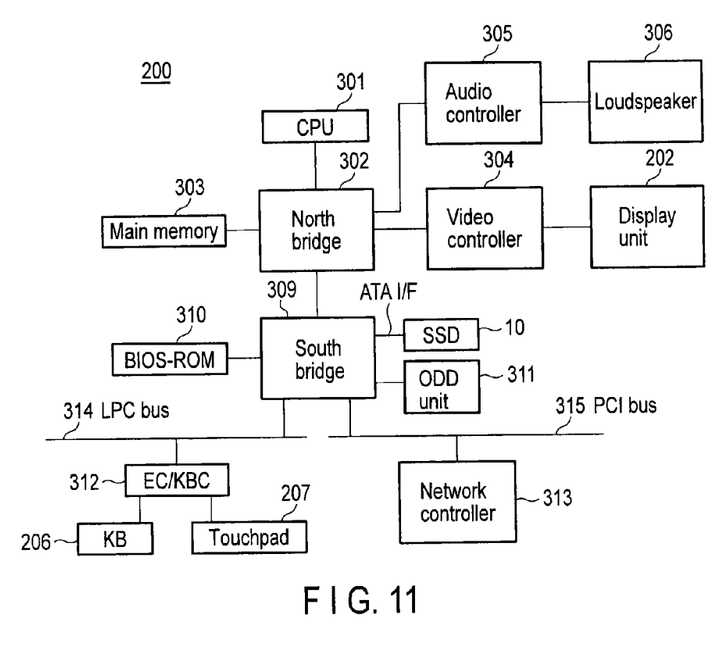
FIG. 11 is a block diagram showing a system configuration example of the personal computer incorporating the SSD.

FIG. 11 is a block diagram showing a system configuration example of the personal computer 200 incorporating the SSD 10. The personal computer 200 includes a CPU 301, a north bridge 302, a main memory 303, a video controller 304, an audio controller 305, a south bridge 309, a BIOS-ROM 310, the SSD 10, an optical disk drive (ODD) unit 311, an embedded controller/keyboard controller IC (EC/KBC) 312, and a network controller 313.

The CPU 301 is a processor for controlling the operation of the personal computer 200, and executes an operating system (OS) loaded from the SSD 10 into the main memory 303. In addition, when the ODD unit 311 makes it possible to execute at least one of a read process and write process for a loaded optical disk, the CPU 301 executes the process. The CPU 301 also executes a system Basic Input/Output System (BIOS) stored in the BIOS-ROM 310. Note that the system BIOS is a program for controlling hardware in the personal computer 200.

The north bridge 302 is a bridge device connecting a local bus of the CPU 301 and the south bridge 309. The north bridge 302 also contains a memory controller for controlling access to the main memory 303. Furthermore, the north bridge 302 has a function of communicating with the video controller 304 via, for example, an Accelerated Graphics Port (AGP) bus 314, and a function of communicating with the audio controller 305.

The main memory 303 temporarily stores programs and data, and functions as a work area of the CPU 301. The main memory 303 is configured by, for example, a RAM.

The video controller 304 is a video reproduction controller for controlling the display unit 202 used as a monitor display of the personal computer 200. The audio controller 305 is an audio reproduction controller for controlling a loudspeaker 306 of the personal computer 200.

The south bridge 309 controls each device on, for example, a Low Pin Count (LPC) bus, and each device on, for example, a Peripheral Component Interconnect (PCI) bus 315. The south bridge 309 also controls the SSD 10 as a memory device for storing various kinds of software and data, via an ATA interface. The personal computer 200 accesses each sector of the SSD 10. A write command, read command, cache flash command, and the like are input to the SSD 10 via the ATA interface. Furthermore, the south bridge 309 has a function of controlling access to the BIOS-ROM 310 and ODD unit 311.

The EC/KBC 312 is a single-chip microcomputer obtained by integrating an embedded controller for power management and a keyboard controller for controlling the keyboard (KB) 206 and touchpad 207. The EC/KBC 312 has a function of turning on/off the power supply of the personal computer 200 in accordance with an operation on the power button by the user. The network controller 313 is a communication device for communicating with an external network such as the Internet.

Figure 12:
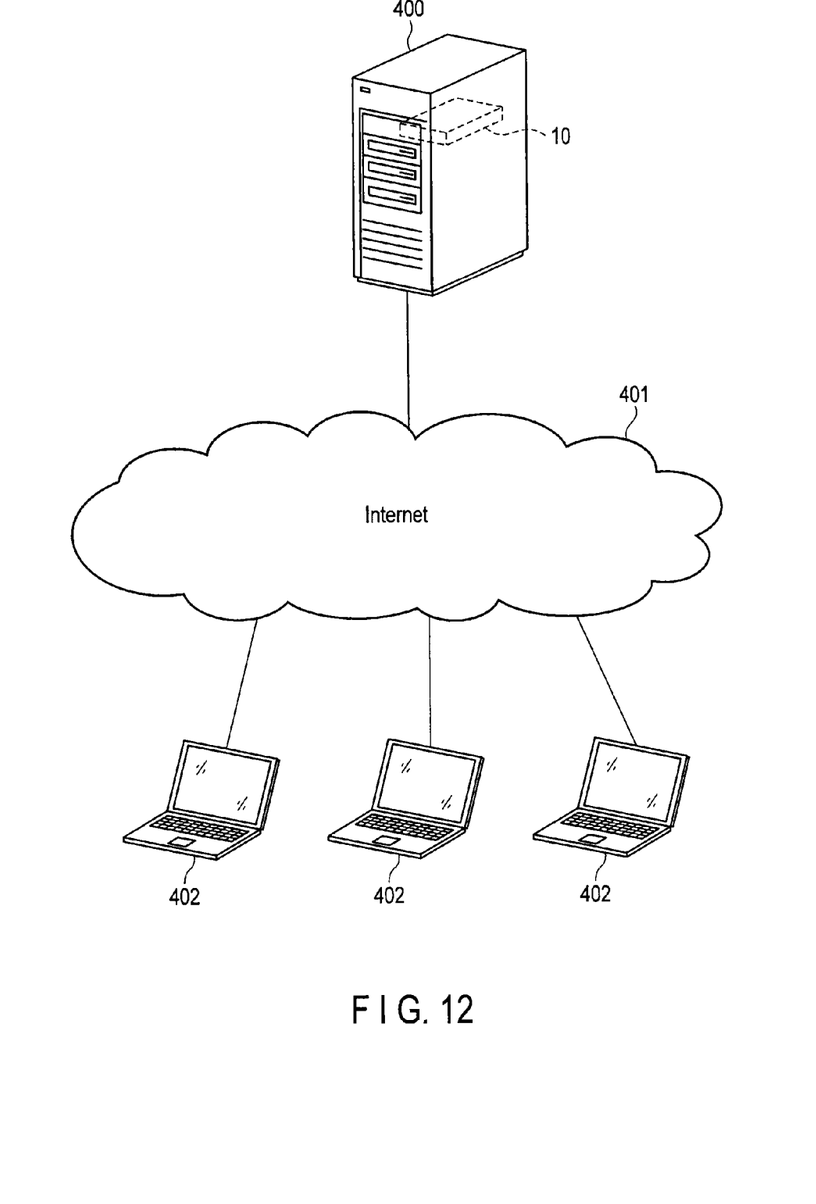
FIG. 12 is a schematic view showing a server incorporating the SSD.

The host device 20 can also be configured by a server connected to a network. FIG. 12 is a schematic view showing a server 400 incorporating the SSD 10.

The server 400 incorporates the SSD 10 for storing data. The server 400 is connected to a network 401 (for example, the Internet). In addition to the server 400, a plurality of clients 402 (personal computers) for providing the information and functions of the server 400 are connected to the network 401.

The server 400 provides files and data stored in the SSD 10 to the clients 402, and also provides its own functions to the clients 402.

Note that in the above-mentioned embodiment, the memory system has been explained by taking an SSD including a NAND flash memory as an example. However, the embodiment is not limited to this, and also applicable to another storage device such as a memory card incorporating a NAND flash memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a nonvolatile memory including first address blocks configured to store an address indicating a data storage position, and second data blocks configured to store the data, each of the first address blocks and the second data blocks including memory cells;
   a memory unit configured to store separate first, second and third tables,
   said first table configured to store a first address including first bits and second bits, the second bits indicating a data storage position in the first address blocks;
   a second table stored in the memory unit and configured to store third bits, the first bits having a compressed first data size by which one of the first blocks can be identified, the third bits having a second data size which is larger than the compressed first data size by which one of the first blocks and the second blocks can be identified;
   a third table configured to store a third address indicating a data storage position corresponding to an externally supplied logical address;
   wherein an address to be stored in the third table is set for each first logical data unit, and an address to be stored in the first table is set for each second logical data unit larger than the first logical data unit; and
   a controller configured to calculate the third address by converting the externally supplied logical address into a logical address of the second logical data unit,
   acquiring the first address from the first table by using the converted logical address of the second logical data unit,
   acquiring the first bits from the acquired first address,
   converting the first bits into third bits using the second table,
   calculating a third address by using a second address obtained by adding the third bits and the second bits, and accessing the third table by using the third address; and
   the controller further configured to access the memory unit using the data storage position information obtained from the third table using the third address.

2. The system of claim 1, wherein
   the third bits comprise information for specifying one of the first address blocks, and
   the controller converts the first bits into the third bits by using the second table, and specifies one of the first address blocks by using the third bits.

3. The system of claim 2, wherein the controller specifies the data storage position in the specified first address block by using the second bits.

4. The system of claim 1, wherein
   the first data size is determined in accordance with the number of entries in the second table, and
   the second data size is determined in accordance with the number of the first blocks and the number of the second blocks.

5. The system of claim 1, wherein
   the nonvolatile memory stores the first table and the second table, and
   the controller reads the first table and the second table from the nonvolatile memory to a volatile memory unit, and uses the first table and the second table in the volatile memory unit.

6. The system of claim 1, wherein
   the nonvolatile memory stores the third table, and
   the controller reads the third table from the nonvolatile memory to a volatile memory unit, and uses the third table in the volatile memory unit.

7. The system of claim 1, wherein a restricted block for storing address information can be changed by changing block information to be stored in the second table.

* * * * *